S. S. FULLER.
TOOL HOLDER.
APPLICATION FILED MAY 27, 1919.
1,355,902. Patented Oct. 19, 1920.
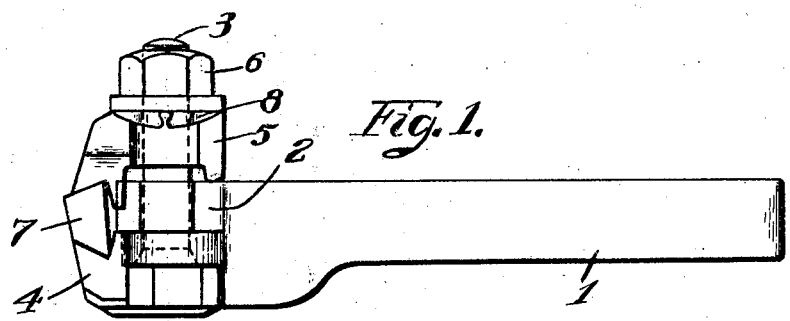
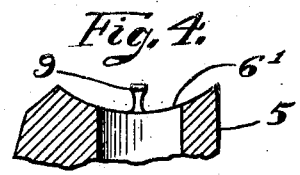
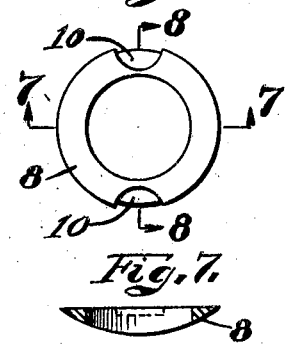
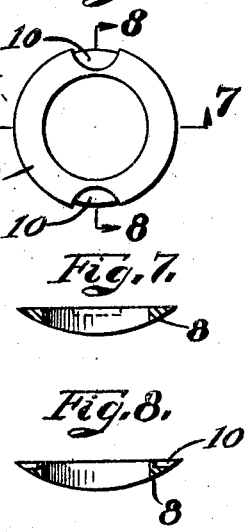
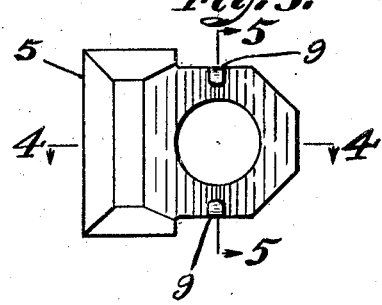
Inventor
Silas S. Fuller
By [signature]
Attorney

UNITED STATES PATENT OFFICE.

SILAS STILLMAN FULLER, OF LEWISTON, MAINE, ASSIGNOR TO PARKER MACHINE COMPANY, OF BOSTON, MASSACHUSETTS, A CORPORATION OF MASSACHUSETTS.

TOOL-HOLDER.

1,355,902.  Specification of Letters Patent.  Patented Oct. 19, 1920.

Application filed May 27, 1919. Serial No. 300,121.

*To all whom it may concern:*

Be it known that I, SILAS S. FULLER, a citizen of the United States, residing at Lewiston, county of Androscoggin, State of Maine, have invented certain new and useful Improvements in Tool-Holders, of which the following is a specification.

This invention relates to tool holders and particularly to a tool holder of the type illustrated in my prior Patent, No. 851,877, being an improvement thereon designed to increase the clamping range.

While generally satisfactory, the holder illustrated in my said patent was not entirely effective in the clamping of cutters of varying widths. Where the cutter was wider than the standard size, the clamp and cutter tended toward looseness on the shank head. Where narrower than standard size the clamp jaw did not always properly engage the cutter.

The object of my present invention is to increase the clamping range of holders of this class, so that cutters of varying widths may be securely clamped without cramping the bolt. This object, together with certain features of advantage which will appear more particularly hereinafter, is secured in the device of the present invention, the construction and use of which, together with a selected embodiment which well illustrates the principles involved and which in itself is a form that I have found highly satisfactory in use and well adapted for the purposes of manufacture, is disclosed in the following specification and drawings, throughout which like reference characters are correspondingly applied.

In the drawings:—

Figure 1 is an elevation of a tool holder equipped with my invention.

Fig. 2 is a detail section illustrating the assembly of the clamp.

Fig. 3 is a plan view of the concave clamping surface.

Figs. 4 and 5 are partial sections on the lines 4—4 and 5—5, respectively of Fig. 3.

Fig. 6 is a plan view of the convex clamping surface, and

Figs. 7 and 8 are sections on the lines 7—7 and 8—8, respectively, of Fig. 6.

For the purposes of this application, I have illustrated my clamp as applied to a tool holder of the type shown in my prior patent. Such holder comprises a shank 1 having a head 2 axially bored to receive a bolt 3 and a pair of spaced clamping jaws 4 and 5 mounted on said bolt at opposite side of the shank head. As here shown, the jaw 4 is integral with the bolt and the jaw 5 is secured to the bolt by a nut 6 threaded thereon, and said jaws clamping a cutter or other tool element 7.

According to my present invention, one clamping jaw of the holder, here shown as the upper jaw 5, is formed as a concave clamping surface, providing a seat $6^1$ for a convex clamping washer 8. The washer 8 has a flat top surface against which the nut 6 bears and is adapted to automatically adjust itself upon the jaw 5 until it finds its proper seat, according to the width of the cutter being clamped.

In order to prevent separation of the surfaces 5 and 8, they may be interlocked, as by bending over oppositely disposed tongues 9 formed upon the jaw 5 into grooves 10 formed in the washer 8.

The length of the grooves 10 and the diameter of the bolt hole in the washer 8 are sufficient to permit the automatic self-adjusting movements of the washer as it seeks and finds its seat.

My improved clamp so increases the clamping range of the holder that cutters of considerable variation in width may be securely clamped without cramping the bolt.

Various modifications in the construction and arrangement of my device may obviously be made, within the limits of the appended claims.

What I therefore claim and desire to secure by Letters Patent is:

1. In a tool holder, a jaw having a face formed to clamp a tool and a face formed as a surface of concavity, a surface of convexity opposing said surface of concavity and automatically self-adjustable thereon, and means for clamping said surfaces in coacting relation.

2. In a tool holder, a shank, a bolt, clamping jaws applied to said bolt at opposite sides of said shank and having their opposing faces formed to clamp an inserted tool therebetween, and one of said jaws having a surface of concavity, and a member loosely mounted on said bolt and having a surface of convexity opposing said surface of concavity and automatically self-adjusting thereon.

3. In a tool holder, a pair of relatively adjustable jaws having their opposing faces formed to clamp an inserted tool therebetween, and one of said jaws having a surface of concavity, a surface of convexity opposing said surface of concavity and automatically self-adjustable thereon, and means for clamping said surfaces in coacting relation.

4. In a tool holder, a pair of relatively movable superposed clamping jaws adapted to clamp an inserted tool therebetween, one of said jaws having a surface of concavity, a surface of convexity opposing said surface of concavity and automatically self-adjustable thereon, and means connecting said jaws and clamping said surfaces in coacting relation.

5. In a tool holder, a shank having a head, a bolt extending through said head, tool clamping jaws applied to said bolt at opposite sides of said head, one of said jaws having a concave surface, a washer loosely mounted upon said bolt for automatic self-adjustment and having a surface of convexity adapted to seat upon said concave surface, and an interlocking connection between said concave jaw and said washer constructed and arranged to prevent separation of said surfaces but permitting limited adjusting movement of one upon the other.

6. In a tool holder having a tool clamping jaw provided with a tool clamping face and an oppositely disposed surface of concavity, a clamping member adjustable relative thereto and having a surface of convexity adapted to seat in said concavity, an interlocking connection between said jaw and clamping member adapted to prevent separation of said surfaces but permitting limited adjusting movement of one upon the other, and means for holding said clamping member and jaw in coacting relation.

7. In a tool holder having a tool clamping jaw provided with a concavity, a clamping member adjustable relative thereto and having a surface of convexity adapted to seat in said concavity, said jaw and clamping member having respectively a tongue and a groove adapted to interlock with each other to prevent separation of said surfaces, but permitting limited adjusting movement of one upon the other, and means for holding said clamping member and jaw in coacting relation.

In testimony whereof I affix my signature in presence of two witnesses.

SILAS STILLMAN FULLER.

Witnesses:
MARION F. WEISS,
GEO. B. RAWLINGS.